(12) United States Patent
Francke et al.

(10) Patent No.: US 6,365,902 B1
(45) Date of Patent: Apr. 2, 2002

(54) RADIATION DETECTOR, AN APPARATUS FOR USE IN RADIOGRAPHY AND A METHOD FOR DETECTING IONIZING RADIATION

(75) Inventors: Tom Francke, Sollentuna; Vladimir Peskov, Stockholm, both of (SE)

(73) Assignee: XCounter AB, Danderyd (SE)

( * ) Notice: Subject to any disclaimer, the term of this patent is extended or adjusted under 35 U.S.C. 154(b) by 0 days.

(21) Appl. No.: 09/563,333

(22) Filed: May 3, 2000

Related U.S. Application Data

(63) Continuation-in-part of application No. 09/444,569, filed on Nov. 19, 1999.

(30) Foreign Application Priority Data

Feb. 11, 2000 (SE) .............................................. 0000438

(51) Int. Cl.[7] ................................................. G01T 1/18
(52) U.S. Cl. ........................ 250/382; 250/383; 250/384
(58) Field of Search ................................. 250/382, 383, 250/384, 385.1, 374, 372, 375

(56) References Cited

U.S. PATENT DOCUMENTS

| | | | |
|---|---|---|---|
| 5,192,861 A | * | 3/1993 | Breskin et al. .......... 250/385.1 |
| 5,604,783 A | | 2/1997 | Charpak |
| 5,614,722 A | | 3/1997 | Solberg et al. |
| 6,118,125 A | | 9/2000 | Carlson et al. |

FOREIGN PATENT DOCUMENTS

| | | |
|---|---|---|
| EP | 0810631 A1 | 12/1997 |
| WO | WO 9923859 | 5/1999 |

* cited by examiner

*Primary Examiner*—Hung Xuan Dang

(57) ABSTRACT

A detector for detection of ionizing radiation, an apparatus for use in planar beam radiography, comprising such a detector, and a method for detecting ionizing radiation. The detector includes a chamber filled with an ionizable medium, at least one first electrode arrangement provided in said chamber where said at least one first electrode arrangement includes an electron avalanche amplification unit, said electron avalanche amplification unit including at least one avalanche cathode and at least one avalanche anode between which a voltage is to be applied for creation of an electric field for avalanche amplification, and at least one arrangement of read-out elements for detection of electron avalanches, wherein said at least one avalanche cathode has at least one hole or opening, wherein an area of said at least one hole or opening in the avalanche cathode is bigger than an area of at least one associated anode as seen from above and where said at least one anode is centered with respect to said at least one hole or opening in the avalanche cathode. A radiation entrance is provided so that radiation enters the conversion volume between the first and second electrode arrangements. In order to achieve well-defined avalanches, the electron avalanche amplification unit includes avalanche regions. The detector, apparatus and method is advantageous since it prevents the formation of harmful sparks.

32 Claims, 3 Drawing Sheets

RADIATION DETECTOR, AN APPARATUS FOR USE IN RADIOGRAPHY AND A METHOD FOR DETECTING IONIZING RADIATION

This application is a continuation in part of Ser. No. 09/444,569 filed Nov. 19, 1999.

FIELD OF THE INVENTION

The invention relates to a detector for detection of ionizing radiation, to an apparatus for use in radiography and to a method for detecting ionizing radiation.

BACKGROUND OF THE INVENTION AND RELATED ART

A drawback with conventional gaseous parallel plate avalanche chambers is that the electrical field between the electrodes, i.e. the voltage applied between the electrodes, needed for efficient operation of the instrument is close to the limit where sparks are produced which could harm the detector.

SUMMARY OF THE INVENTION

A main object of the invention is to provide an improved detector for detection of ionizing radiation, which employs avalanche amplification, and ensures stronger focusing effect than in conventional designs, and which can be manufactured in a simple and cost effective way. The stronger focusing effect will render the streamer formation more difficult compared to prior art designs.

This and other objects are attained by a detector for detection of ionizing radiation, comprising, a chamber filled with an ionizable medium, at least one first electrode arrangement provided in said chamber where said at least one first electrode arrangement includes an electron avalanche amplification unit, said electron avalanche amplification unit including at least one avalanche cathode and at least one avalanche anode between which a voltage is to be applied for creation of an electric field for avalanche amplification, and at least one arrangement of read-out elements for detection of electron avalanches, wherein said at least one avalanche cathode has at least one hole or opening, wherein an area of said at least one hole or opening in the avalanche cathode is bigger than an area of at least one associated anode as seen from above and where said at least one anode is centered with respect to said at least one hole or opening in the avalanche cathode.

The detector also can operate at high X-ray fluxes without performance degradation and has a long lifetime.

The detector of claim 1 also achieves effective detection of any kind of radiation, including electromagnetic radiation as well as incident particles, including elementary particles.

It is also an object of the invention to provide an apparatus for use in radiography comprising said detector for detection of ionizing radiation, which employs avalanche amplification, provides well-defined avalanches, and can be manufactured in a simple and cost effective way.

This and other objects are attained by an apparatus for use in radiography, comprising an X-ray source, and a detector for detection of ionizing radiation, comprising a chamber filled with an ionizable medium, at least one first electrode arrangement provided in said chamber where said at least one first electrode arrangement includes an electron avalanche amplification unit, said electron avalanche amplification unit including at least one avalanche cathode and at least one avalanche anode between which a voltage is to be applied for creation of an electric field for avalanche amplification, and at least one arrangement of read-out elements for detection of electron avalanches, wherein said at least one avalanche cathode has at least one hole or opening, wherein an area of said at least one hole or opening in the avalanche cathode is bigger than an area of at least one associated anode as seen from above and where said at least one anode is centered with respect to said at least one hole or opening in the avalanche cathode.

The apparatus for use in radiography, may also include a simple and inexpensive detector that can operate with high X-ray detection efficiency and with good energy resolution for X-rays.

The apparatus for use in radiography, may also include a detector which can operate at high X-ray fluxes without a performance degradation and has a long lifetime.

It is also an object of the invention to provide a method for detection of ionizing radiation, which employs avalanche amplification, provides well-defined avalanches and focusing of the electrons by means of at least one focusing electrode, and can be implemented in a simple and cost effective way.

This and other objects are attained by a method for detecting ionizing radiation, wherein the radiation interacts with atoms in a volume filled with an ionizable medium, for creation of released electrons, said method comprising forming in each of at least one region, including at least one avalanche cathode and at least one avalanche anode, a concentrated electric field for causing electron avalanches, and detecting the electron avalanches with readout elements, by focusing the electrons with at least one anode, having a smaller area than associated holes or openings in the at least one avalanche cathode and where the area of the at least one anode is centered with respect to the associated holes or openings in the at least one cathode.

The method can be used at high X-ray fluxes.

DESCRIPTION OF PREFERRED EMBODIMENTS

Figure 1:
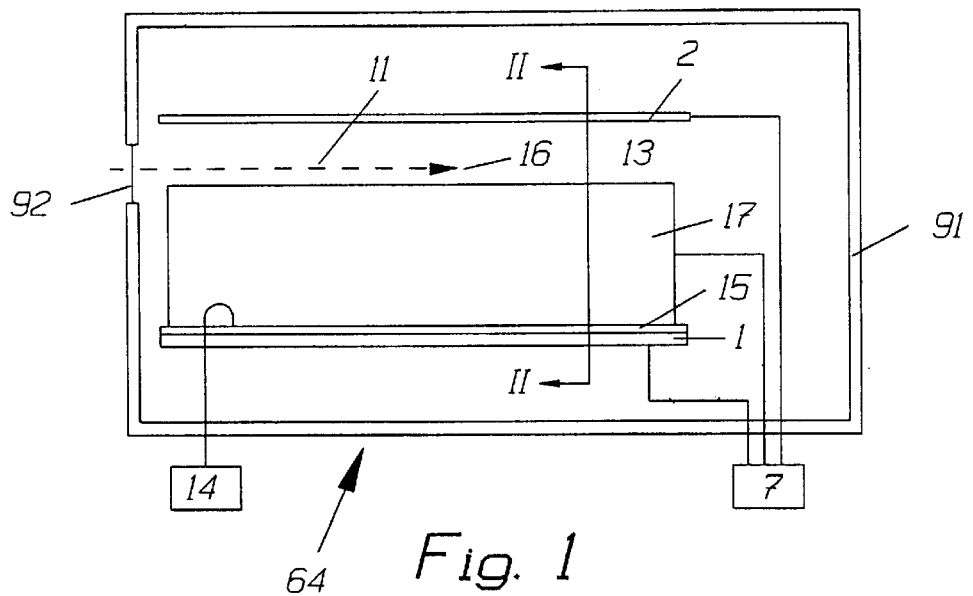
FIG. 1 illustrates schematically, in an overall view, a general embodiment of a detector for radiography.

FIG. 1 is a sectional view in a plane orthogonal to the plane of a planar X-ray beam 9 of a detector 64 for radiography.

A major fraction of the incident X-ray photons are detected in the detector 64, which includes a conversion and drift volume 13 and an electron avalanche amplification unit 17. The X-ray photons may enter sideways between two electrode arrangements 1, 2, between which an electric field for the drift of electrons and ions in the conversion and drift volume 13 is created or alternatively enter the detector from any direction in the range of 0–180° where 0° is defined as coinciding with the above-mentioned sideways entry direction.

The detector 64 and its operation according to the invention will be further described below.

The detector 64 includes a first drift electrode arrangement being a cathode plate 2 and a second drift electrode arrangement being an anode plate 1. The plates 1, 2 may be mutually parallel and a gap or region 13 in between includes an ionizable medium such as a gaseous medium, liquid medium or a solid medium, and is termed the conversion and drift volume 13, and the electron avalanche amplification unit 17. Alternatively, the plates 1,2 are non-parallel.

A voltage is applied between the anode plate 1 and the cathode plate 2, and one or several voltages is (are) applied on the electron avalanche amplification unit 17. This results in a drift field causing a drift of electrons and ions in the gap 13, and electron avalanche amplification fields in the electron avalanche amplification unit 17. In connection with the anode plate 1, is an arrangement 15 of read-out elements for detection of electron avalanches Preferably the arrangement of read-out elements 15 also constitutes the anode electrode. Alternatively, the arrangement of read-out elements 15 can be formed in connection with the cathode plate 2 or the electron avalanche amplification unit 17. The arrangement of read-out elements 15 can also be formed on the anode or cathode plate separated from the anode or cathode electrode by a dielectric layer or substrate. In this case, the anode or cathode electrode should be semi-transparent to induced pulses, e.g. the anode or cathode electrode should be formed as strips or pads.

In case of X-rays incident sideways on the detector 64 between the cathode plate 2 and the anode plate 1, the detector 64 can easily be made with an interaction path long enough to allow a major fraction of the incident X-ray photons to interact and be detected. A collimator may be used for this purpose and should preferably be arranged so that the thin planar beam enters the detector 64 close to the electron avalanche amplification unit 17 and preferably parallel therewith.

The gaseous ionizable medium can be a mixture of for example 90% krypton and 10% carbon dioxide or a mixture of for example 80% xenon and 20% carbon dioxide. The gas can be under pressure, preferably in a range 1–20 atm. Therefore, the detector 64 includes a gas tight housing 91 with a slit entrance window 92, through which the X-ray beam 9 enters the detector 64. The window 92 may be made of a material, which is transparent for the radiation, e.g. Mylar®, or a thin aluminum foil. Detecting sideways incident beams in a gaseous avalanche chamber 64 is a particularly advantageous additional effect of the invention. The slit entrance window 92 is arranged at another place on the housing 91 than indicated in FIG. 1 when X-rays enter the detector from a direction which is not sideways, i.e. ≠0 or 180°, alternatively the housing 91 may be made of a material transparent to the X-rays.

The liquid ionizable medium may for instance be Tri Methyl Ethane (TME) or Tri Methyl Pentane (TMP) or another liquid ionizable media with similar properties.

The solid ionizable medium may for instance be a semi conducting material, for instance, silicon. When the ionizable medium is solid the housing 91 can be excluded.

In operation, the incident X-rays 9 enter the detector 64 and travel through the gas, liquid or solid ionizable medium in a direction in the range of 0–180° as defined above. Each X-ray photon produces a primary ionization electron-ion pair within the gas, liquid or solid ionizable medium as a result of interaction with an atom in the medium. This production may be caused by photoeffect, Compton-effect or Auger-effect. Each primary electron 11 produced loses its kinetic energy through interactions with new atoms, causing further production of electron-ion pairs (secondary ionization electron-ion pairs). Typically between a few hundred and a few thousand secondary ionization electron-ion pairs are produced from a 20 keV X-ray photon in this process. The secondary ionization electrons 16 (together with the primary ionization electron 11) will drift towards the electron avalanche amplification unit 17 due to the electric field in the conversion and drift volume 13. When the electrons 11, 16 enter regions of focused field lines of the electron avalanche amplification unit 17, they will undergo avalanche amplification, which will be described further below.

The movements of the avalanche electrons and ions induce signals in the arrangement 15 of read-out elements for the detection of electron avalanches. The signals are picked up in connection with the electron avalanche amplification unit 17, the cathode plate 2 or the anode plate 1, or a combination of two or more of said locations. The signals are further amplified and processed by readout circuitry 14 to obtain accurate measurements of the X-ray photon interaction points, and optionally the X-ray photon energies.

Figure 2:
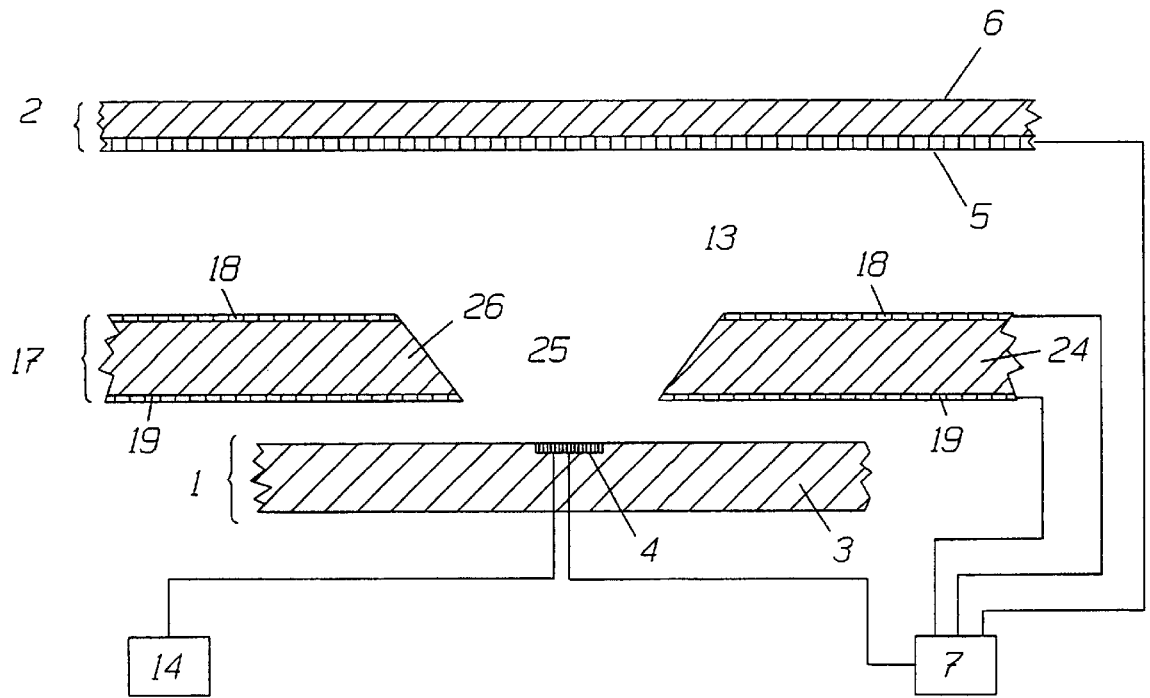
FIG. 2 is a schematic, partly enlarged, cross sectional view, taken at II—II in FIG. 1, of a detector according to a first specific embodiment of the invention.

FIG. 2 shows a schematic, partly enlarged, cross sectional view, taken at II—II in FIG. 1, of a detector 64 according to a first specific embodiment of the invention. As seen, the cathode plate 2 includes a dielectric substrate 6 and a conductive layer 5 acting as a cathode electrode. The anode 1 includes a dielectric substrate 3 and a conductive layer 4 acting as an anode electrode. Between the gap 13 and the anode 1, the electron avalanche amplification unit 17 is arranged. The electron avalanche amplification unit 17 includes an avalanche amplification cathode 18 and a focusing electrode 19, separated by a dielectric 24. The dielectric 24 could be a gas, liquid or a solid substrate 24 carrying the cathode 18 and the focusing electrode 19, as shown in FIG. 2.

Between the cathode 18 and the focusing electrode 19 a voltage is applied by a DC power supply 7 for creation of a very strong focused electric field in an avalanche amplification region 25. The avalanche amplification region 25 is formed in a region between and around the edges of the avalanche cathode 18 which are facing each other, where a concentrated electric field occurs due to the applied voltages. The DC power supply 7 is also connected with the cathode electrode 5 and the anode electrode 4 (19). The voltages applied are selected so that a weaker electric field, drift field, is created over the gap 13. Electrons 11, 16 (primary and secondary electrons) released by interaction in the conversion and drift volume 13 will drift, due to the drift field, towards the electron avalanche amplification unit 17. The electrons 11, 16 enter the very strong avalanche amplification fields and are accelerated. The accelerated electrons 11, 16 interact with other atoms in the region 25 causing further electron-ion pairs to be produced. Those electron-ion pairs will also be accelerated in the field, and will interact with new atoms, causing further electron-ion pairs to be produced. This process continues during the travel of the electrons in the avalanche region 25 towards the anode 4 and an electron avalanche is formed.

The avalanche region 25 is formed by an opening or channel in the cathode 18 and the dielectric substrate 24, if present. The opening or channel can be of any shape for instance circular, square, triangular, rectangular, elliptical etc., when viewed from above, or continuous, longitudinal extending between two edges of the substrate 24, if present, and the cathode 18. In the case the openings or channels are circular when viewed from above, they may be arranged in rows, each row of openings or channels including a plurality of circular openings or channels. A plurality of longitudinal openings or channels or rows of circular channels may be formed beside each other, parallel with each other or with the incident X-rays. Alternatively, the circular openings or channels can be arranged in other patterns.

As an example, the longitudinal channels in the cathode 18 can have a width in the range 0.01–1 mm. The longitudinal openings or holes in the focusing electrode 19 are smaller than the associated longitudinal openings or holes in the cathode 18. The dielectric 24 may have an inclined surface 26 with respect to a normal to a surface of the avalanche cathode 18, the inclined surface 26 forming a limiting surface of a region for avalanche amplification. The size of the area of the anode 4, as seen from above, is smaller than the associated area of the focusing electrode 19.

The difference in size of the holes or openings in the cathode 18, the focusing electrode 19 and the anode 4 ensure stronger focusing effect compared to holes or openings of equal sizes. If a streamer appears at high gains they will be self-quenched. The reason for the self-quenching is the focused field lines and the radial dependency of the field strength seen from the avalanche region 25.

Alternatively the conductive layers 5, 4 can be replaced by a resistive carrier of e.g. silicon monoxide, conductive glass or diamond, with the dielectric substrates 3, 6 being replaced by a conductive layer.

An electric field is created between the anode electrodes 4 and the focusing electrode 19. This field could be a drift field, i.e. a weaker field, or an avalanche amplification field, i.e. a very strong electric field.

As an alternative, the electric field in the conversion and drift gap 13 (volume) can be kept high enough to cause electron avalanches, hence to be used in a pre-amplification mode.

The distance between the cathode plate 2 and the electron avalanche amplification unit 17 may be in the range of 0–10 mm but preferably within the range of 100–5000 μm. The distance between the avalanche amplification cathode 18 and the focusing electrode 19 may be in the range of 0–10 mm but preferably within the range of 50–500 μm. The distance between the focusing electrode 19 and the anode substrate 3 may be in the range of 0–1 mm, but preferably within the range of 50–500 μm.

Figure 3:
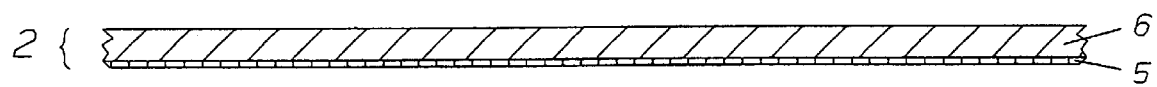
FIG. 3 is a schematic, partly enlarged, cross sectional view, taken at II—II in FIG. 1, of a detector according to a second specific embodiment of the invention.
Figure 3:
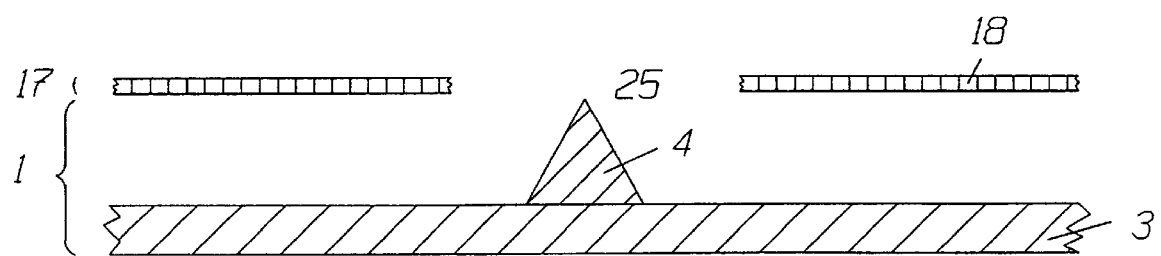

FIG. 3 shows a schematic, partly enlarged, cross sectional view, taken at II—II in FIG. 1, of a detector 64 according to a second specific embodiment of the invention. As seen, the cathode plate 2 includes a dielectric substrate 6 and a conductive layer 5 acting as a cathode electrode. The anode 1 includes a dielectric substrate 3 and an extended conductive layer 4 acting as an anode electrode. The avalanche cathode 18 acts in this embodiment, as the avalanche amplification unit 17, i.e. the distance in FIG. 2 between the avalanche cathode 18 and focusing electrode 19 is reduced to 0 in this embodiment. Due to the shape of extended anode 4 more field lines per unit area may be incident at the top of said anode compared to the inclined surface, thereby increasing the gain of the detector 64. The area of the extended anode 4, as seen from above, is smaller than the associated area of the hole or opening in the avalanche cathode 18. It is noted that the top portion of the anode 4 may be any shape (for example, flat, rounded or pointed) as long as the shape allows more field lines per unit area to be incident at the top of the anode 4 as compared with the inclined surface.

Figure 4:
FIG. 4 is a schematic cross sectional view of an alternate embodiment of an anode.

In FIG. 4, another embodiment of the extended anode 4 arranged on the substrate 3 is shown. In this embodiment the extended anode 4 has a smooth shape, e.g. like a half ellipse. The height of the extended anode could be as high as the distance between the substrate 3 and the focusing electrode 19 if present or the avalanche cathode 18 in absence of said focusing electrode 19.

Figure 5:
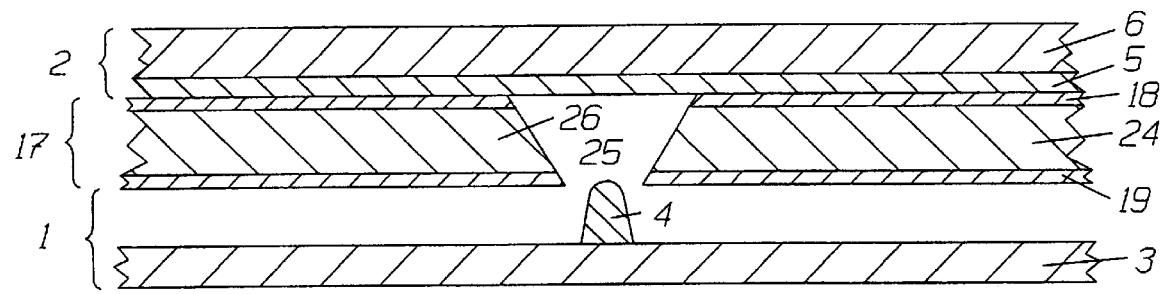
FIG. 5 is a schematic, partly enlarged, cross sectional view, taken at II—II in FIG. 1, of a detector according to a third specific embodiment of the invention.

FIG. 5 shows a schematic, partly enlarged, cross sectional view, taken at II—II in FIG. 1, of a detector 64 according to a third specific embodiment of the invention. The anode 1 includes a dielectric substrate 3 and an extended conductive layer 4 acting as an anode electrode. The avalanche cathode 18 and the focusing electrode 19 act, in this embodiment, as the avalanche amplification unit 17. The distance between the cathode 2, including a dielectric substrate 6 and a conductive layer 5, and the avalanche cathode 18 is reduced to 0 in the embodiment as shown in FIG. 5, thereby eliminating the volume 13, i.e. the drift and conversion volume. In this embodiment the incident X-rays will enter the detector 64 directly in the avalanche region 25 where the electrical field is very high. Due to the shape of extended anode 4 more field lines per unit area will be incident at the top of said anode compared to the inclined surface, thereby increasing the position resolution of the anode 4. The area of the extended anode 4, as seen from above, is smaller than the associated area of the hole or opening in the avalanche cathode 18 and the area of the hole or opening in the focusing detector.

Figure 6:
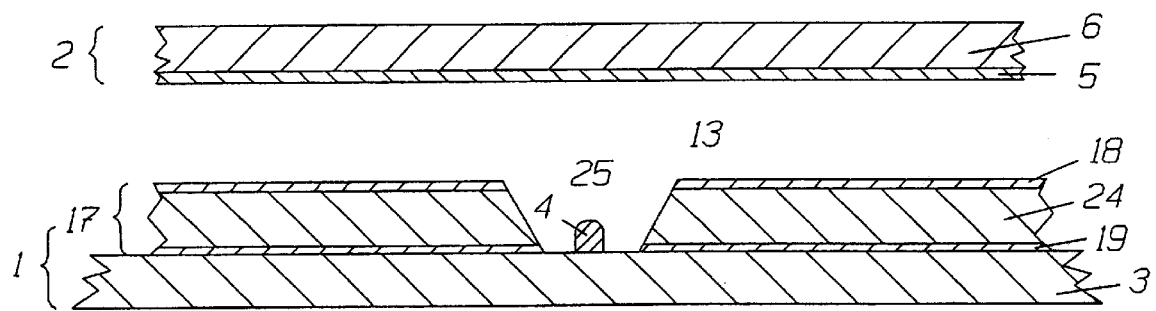
FIG. 6 is a schematic, partly enlarged, cross sectional view, taken at II—II in FIG. 1, of a detector according to a fourth specific embodiment of the invention.

FIG. 6 shows a schematic, partly enlarged, cross sectional view, taken at II—II in FIG. 1, of a detector according to a fourth specific embodiment of the invention. The anode 1 includes a dielectric substrate 3 and an extended conductive layer 4 acting as an anode electrode. As seen, the cathode plate 2 includes a dielectric substrate 6 and a conductive layer 5 acting as a cathode electrode. Between the gap 13 and the anode 1 an electron avalanche amplification unit 17 is arranged. The avalanche cathode 18 and the focusing electrode 19 represent, in this embodiment, the avalanche amplification unit 17. The voltages applied are selected so that a weaker electric field, drift field, is created over the gap 13. Electrons 11, 16 (primary and secondary electrons) released by interaction in the conversion and drift volume 13 will drift, due to the drift field, towards the avalanche amplification unit 17. The electrons 11, 16 enter the very strong avalanche amplification fields and are accelerated. The accelerated electrons 11, 16 interact with other atoms in the region 25 causing further electron-ion pairs to be produced. Those produced electron-ion pairs will also be accelerated in the field, and may interact with new atoms, causing further electron-ion pairs to be produced. This process continues during the travel of the electrons in the avalanche region towards the anode 4 and an electron avalanche is formed. In comparison to FIG. 2, the distance between the focusing electrode and the dielectric substrate 3 is reduced to 0 in the embodiment as shown in FIG. 6. Due to the shape of extended anode 4, more field lines per unit area will be incident at the top of said anode compared to the inclined surface, thereby increasing the gain of the apparatus. The area of the extended anode 4, as seen from above, is smaller than the associated area of the hole or opening in the avalanche cathode 18 and the area of the hole or opening in the focusing detector.

An apparatus comprising the inventive detector, as described above, may also include an X-ray source, for irradiation of an object to be imaged. The X-rays from the X-ray source are transmitted through the object and enter the inventive detector 64.

In general, for all embodiments the gas, liquid or solid volumes may be very thin, which results in a fast removal of ions, which leads to low or no accumulation of space charges. This makes operation at high rate possible.

In general, for all embodiments, smaller distances lead to low operating voltages, which results in low energy and a reduced possibility for sparks, which is favorable for the electronics.

A streamer is a form of channel of plasma in which a spark can form. The focusing of the field lines in the embodiments is also favorable for suppressing streamer formations. This also leads to a reduced risk of sparks.

Although the invention has been described in conjunction with a number of preferred embodiments, it is to be understood that various modifications may still be made without departing from the spirit and scope of the invention, as defined by the appended claims. For example the voltages can be applied in other ways as long as the described electrical fields are created.

What is claimed is:

1. A detector for detection of ionizing radiation, comprising:
   a chamber filled with an ionizable medium,
   at least one first electrode arrangement provided in said chamber where said at least one first electrode arrangement includes an electron avalanche amplification unit,
   said electron avalanche amplification unit including at least one avalanche cathode and at least one avalanche anode between which a voltage is to be applied for creation of an electric field for avalanche amplification, and
   at least one arrangement of read-out elements for detection of electron avalanches, wherein said at least one avalanche cathode has at least one hole or opening, wherein an area of said at least one hole or opening in the avalanche cathode is bigger than an area of at least one associated anode as seen from above and where said at least one anode is centered with respect to said at least one hole or opening in the avalanche cathode.

2. The detector according to claim 1, further comprising at least one second electrode arrangement, provided in said chamber, including a conversion and drift volume.

3. The detector according to claim 1, further comprising at least one focusing electrode, arranged between said at least one avalanche cathode and said at least one avalanche anode where said at least one focusing electrode has an opening or hole smaller than the at least one hole or opening in said avalanche cathode but bigger than an area of said at least one avalanche anode.

4. The detector according to claim 3, wherein said at least one focusing electrode includes two or more focusing electrodes, each of said focusing electrodes having a smaller hole or opening in a direction against the avalanche anode.

5. The detector according to claim 4, wherein
   said at least one avalanche cathode, said at least one focusing electrode and said at least one avalanche anode are arranged as stacked layers with dielectric material in between.

6. The detector according to claims 5, wherein
   a surface of said dielectric material forms at least one limiting surface of a region for avalanche amplification where said surface is inclined with respect to a surface of said at least one avalanche cathode.

7. The detector according to claim 1, wherein the ionizable medium is a gaseous medium, a liquid medium or a solid medium.

8. An apparatus for use in radiography, comprising
   an X-ray source, and a detector for detection of ionizing radiation, comprising:
   a chamber filled with an ionizable medium,
   at least one first electrode arrangement provided in said chamber where said at least one first electrode arrangement includes an electron avalanche amplification unit,
   said electron avalanche amplification unit) including at least one avalanche cathode and at least one avalanche anode between which a voltage is to be applied for creation of an electric field for avalanche amplification, and
   at least one arrangement of read-out elements for detection of electron avalanches, wherein said at least one avalanche cathode has at least one hole or opening, wherein an area of said at least one hole or opening in the avalanche cathode is bigger than an area of at least one associated anode as seen from above and where said at least one anode is centered with respect to said at least one hole or opening in the avalanche cathode.

9. The method according to claim 8, further comprising:
   subjecting the electrons to a first electric field in a conversion and drift volume, where the first electric field forces the electrons to enter the at least one region with a concentrated electric field.

10. A method for detecting ionizing radiation, wherein the radiation interacts with atoms in a volume filled with an ionizable medium, for creation of released electrons, said method comprising
    forming in each of at least one region, including at least one avalanche cathode and at least one avalanche anode, a concentrated electric field for causing electron avalanches, and
    detecting the electron avalanches with read-out elements, by focusing the electrons with at least one anode, having a smaller area than associated holes or openings in the at least one avalanche cathode and where the area of the at least one anode is centered with respect to the associated holes or openings in the at least one cathode.

11. The method according to claim 10, further comprising:
    focusing the electrons with at least one focusing electrode arranged between the at least one avalanche cathode and the at least one avalanche anode where the at least one focusing electrode has a hole or opening smaller than a hole or opening in the at least one avalanche cathode.

12. A detector for detection of ionizing radiation, comprising:
    an electron avalanche amplification unit having at least one hole or opening; and
    at least one anode;
    wherein an area of said at least one hole or opening is larger than an area of said at least one anode and wherein said at least one anode is substantially centered with respect to the hole or opening in said electron avalanche amplification unit.

13. The detector of claim 12, wherein said electron avalanche amplification unit includes an avalanche amplification cathode and a focussing electrode.

14. The detector of claim 13, wherein said at least one anode protrudes into the hole or opening.

15. The detector of claim 14, wherein a top portion of said at least one anode is one of substantially flat, substantially pointed, and substantially rounded.

16. The detector of claim 15, wherein the top of said at least one anode is rounded, said detector further including first and second drift electrodes wherein said electron avalanche amplification unit is adjacent to at least said first drift electrode.

17. The detector of claim 15, wherein the top of said at least one anode is rounded, said detector further including first and second drift electrodes wherein said electron avalanche amplification unit is adjacent to at least said second drift electrode.

18. The detector of claim 13, wherein the hole or opening is larger in said avalanche amplification cathode than in said focussing electrode.

19. The detector of claim 18, wherein at least one wall of the hole or opening is inclined.

20. The detector of claim 13, said detector further including first and second drift electrodes wherein said electron avalanche amplification unit is separated from both said first and second drift electrodes.

21. The detector of claim 13, said detector further including first and second drift electrodes wherein said electron avalanche amplification unit is separated from said first drift electrode.

22. The detector of claim 13, said detector further including first and second drift electrodes wherein said electron avalanche amplification unit is separated from said second drift electrode.

23. The detector of claim 12, wherein said at least one anode is substantially embedded in a substrate.

24. The detector of claim 23, said detector further including first and second drift electrodes wherein said electron avalanche amplification unit is separated from both said first and second drift electrodes and said at least one anode is part of one of said first and second drift electrodes.

25. The detector of claim 12, wherein said electron avalanche amplification unit includes an avalanche amplification cathode.

26. The detector of claim 25, wherein said at least one anode is substantially embedded in a substrate.

27. The detector of claim 25, wherein said at least one anode protrudes into the hole or opening.

28. The detector of claim 27, wherein a top portion of said at least one anode is one of substantially flat, substantially pointed, and substantially rounded.

29. The detector of claim 25, wherein at least one wall of the hole or opening is inclined.

30. The detector of claim 25, said detector further including first and second drift electrodes wherein said electron avalanche amplification unit is separated from both said first and second drift electrodes.

31. The detector of claim 25, said detector further including first and second drift electrodes wherein said electron avalanche amplification unit is adjacent to at least said first drift electrode.

32. The detector of claim 25, said detector further including first and second drift electrodes wherein said electron avalanche amplification unit is adjacent to at least said second drift electrode.

* * * * *